(12) United States Patent
Minato et al.

(10) Patent No.: US 9,607,244 B2
(45) Date of Patent: Mar. 28, 2017

(54) IMAGE PROCESSING DEVICE, SYSTEM, IMAGE PROCESSING METHOD, AND IMAGE PROCESSING PROGRAM

(71) Applicant: OMRON CORPORATION, Kyoto (JP)

(72) Inventors: Yoshihisa Minato, Kyoto (JP); Yutaka Kato, Kyoto (JP)

(73) Assignee: OMRON CORPORATION, Kyoto (JP)

(*) Notice: Subject to any disclaimer, the term of this patent is extended or adjusted under 35 U.S.C. 154(b) by 5 days.

(21) Appl. No.: 14/625,894

(22) Filed: Feb. 19, 2015

(65) Prior Publication Data

US 2015/0262415 A1   Sep. 17, 2015

(30) Foreign Application Priority Data

Mar. 13, 2014   (JP) ................... 2014-050256

(51) Int. Cl.
*G06K 9/62* (2006.01)
*B07C 5/342* (2006.01)
(Continued)

(52) U.S. Cl.
CPC .......... *G06K 9/6211* (2013.01); *B07C 5/3422* (2013.01); *B25J 9/1697* (2013.01);
(Continued)

(58) Field of Classification Search
None
See application file for complete search history.

(56) References Cited

U.S. PATENT DOCUMENTS 5,325,475 A   6/1994 Poggio et al.
6,633,686 B1   10/2003 Bakircioglu et al.
(Continued)

FOREIGN PATENT DOCUMENTS

EP   2058761   5/2009
EP   2249289   11/2010
(Continued)

OTHER PUBLICATIONS

Extended European Search Report in EP 15155707.1, dated Jul. 29, 2015.
(Continued)

*Primary Examiner* — Kim Vu
*Assistant Examiner* — Nathan Bloom
(74) *Attorney, Agent, or Firm* — Greenblum & Bernstein, P.L.C.

(57) ABSTRACT

Disclosed is an image processing device that includes: a storage unit that holds model information including information indicating a plurality of feature points of a detection object; a correspondence-relationship determination unit that extracts a plurality of feature points included in an input image as a two-dimensional image or a three-dimensional image and that determines a correspondence relationship between an extracted plurality of feature points and a plurality of feature points of the model information; and a position estimating unit that estimates, based on the correspondence relationship, one or a plurality of second positions of the input image corresponding to one or a plurality of first positions set relatively to the detection object. The one or plurality of first positions is included in a point, a line, or a region.

10 Claims, 9 Drawing Sheets

(51) Int. Cl.
- *G06K 9/00* (2006.01)
- *B25J 9/16* (2006.01)
- *G06T 7/40* (2006.01)
- *G06T 7/00* (2006.01)
- *G06K 9/46* (2006.01)
- *G06T 7/73* (2017.01)

(52) U.S. Cl.
CPC ..... *G06K 9/00201* (2013.01); *G06K 9/00208* (2013.01); *G06K 9/4604* (2013.01); *G06K 9/6204* (2013.01); *G06T 7/0004* (2013.01); *G06T 7/0046* (2013.01); *G06T 7/75* (2017.01); *G06K 2209/19* (2013.01); *G06T 2207/10012* (2013.01); *G06T 2207/30164* (2013.01)

(56) References Cited

U.S. PATENT DOCUMENTS

| | | | |
|---|---|---|---|
| 2005/0286767 A1* | 12/2005 | Hager | G06K 9/00208 382/190 |
| 2008/0013836 A1 | 1/2008 | Nakamura et al. | |
| 2009/0116728 A1 | 5/2009 | Agrawal et al. | |
| 2009/0322860 A1* | 12/2009 | Zhang | G06T 7/0046 348/46 |
| 2010/0027892 A1* | 2/2010 | Guan | G06K 9/00355 382/203 |
| 2010/0098324 A1* | 4/2010 | Fujieda | B25J 9/1697 382/154 |
| 2010/0284608 A1 | 11/2010 | Monti et al. | |
| 2011/0025853 A1* | 2/2011 | Richardson | G06T 7/2033 348/159 |
| 2014/0067317 A1 | 3/2014 | Kobayashi et al. | |
| 2014/0211989 A1* | 7/2014 | Ding | G06K 9/6211 382/103 |
| 2015/0117750 A1 | 4/2015 | Minato et al. | |

FOREIGN PATENT DOCUMENTS

| | | |
|---|---|---|
| EP | 2808674 | 12/2014 |
| JP | 2013-156094 | 8/2013 |
| WO | 94/06093 | 3/1994 |

OTHER PUBLICATIONS

U.S. Appl. No. 14/602,565 to Yoshihisa Minato et al., filed Jan. 22, 2015.

U.S. Appl. No. 14/561,728 to Yoshihisa Minato et al., filed Dec. 5, 2014.

U.S. Appl. No. 14/601,524 to Yoshihisa Minato et al., filed Jan. 21, 2015.

Communication Pursuant to Article 94(3) EPC in Application No. EP 15155707.1, dated Oct. 13, 2016.

* cited by examiner

IMAGE PROCESSING DEVICE, SYSTEM, IMAGE PROCESSING METHOD, AND IMAGE PROCESSING PROGRAM

CROSS-REFERENCE TO RELATED APPLICATION

This application is based on Japanese Patent Application No. 2014-050256 filed with the Japan Patent Office on Mar. 13, 2014, the entire contents of which are incorporated herein by reference.

FIELD

The present invention relates to an image processing device, an image processing method, and an image processing program capable of recognizing a position of a substance of which a shape can change, and also relates to a system including the image processing device.

BACKGROUND

In the FA (Factory Automation) field, there are executed a processing of measuring a size, a position, and the like of a detection object such as a work, by image-capturing the detection object, and a processing of searching for a position or a region that matches a pre-registered model image.

For example, Unexamined Japanese Patent Publication No. 2013-156094 discloses a technique of automatically adaptively setting a test region and making it possible to perform a test with high accuracy, even when a test object has an individual difference and even when a position and a direction of the test object are indefinite.

SUMMARY

As an application of the above image processing, there is the application for image-capturing a detection object, specifying a position or a region in which the detection object exists, and also giving a certain work (for example, grasping of a work and various kinds of processing to the work) to an arbitrarily-determined position or region based on a specified position or region. According to such an application, information of a feature amount of the detection object and the position or the region where the work is to be given to the detection object is pre-registered as model information.

However, there is a case where an object having a possibility of generating a shape different from a shape registered as model information becomes a detection object. For example, there are assumed a work of which a shape is determined depending on an environmental condition such as temperature and humidity in the pre-process, and a work configured by a flexible material of which a shape easily changes by receiving the influence of external force (gravity, for example).

There has been desired a method capable of properly determining a position at which the work is to be given to a detection object, even when the detection object can generate a shape different from a shape registered as model information.

An image processing device according to an aspect of the present invention includes: a storage unit that holds model information including information indicating a plurality of feature points of a detection object; a correspondence-relationship determination unit that extracts a plurality of feature points included in an input image as a two-dimensional image or a three-dimensional image and that determines a correspondence relationship between an extracted plurality of feature points and a plurality of feature points of the model information; and a position estimating unit that estimates, based on the correspondence relationship, one or a plurality of second positions of the input image corresponding to one or a plurality of first positions set relatively to the detection object. The one or plurality of first positions is included in a point, a line, or a region.

Preferably, the correspondence-relationship determination unit relates, as one to one, each feature point of the model information and each feature point extracted from the input image, and also determines, from mutually-related features, a function indicating a correspondence relationship between a set of a plurality of feature points of the model information and a set of a plurality of feature points extracted from the input image.

A system according to other aspect of the present invention includes an image processing device, and a robot that operates following an output from the image processing device. The image processing device includes: a storage unit that holds model information including information indicating a plurality of feature points of a detection object; a correspondence-relationship determination unit that extracts a plurality of feature points included in an input image as a two-dimensional image or a three-dimensional image and that determines a correspondence relationship between an extracted plurality of feature points and a plurality of feature points of the model information; a position estimating unit that estimates, based on the correspondence relationship, one or a plurality of second positions of the input image corresponding to one or a plurality of first positions set relatively to the detection object; and a command generation unit that generates a command to the robot based on the estimated second position. The one or plurality of first positions is included in a point, a line, or a region.

An image processing method according to a still other aspect of the present invention includes: a step of obtaining model information including information indicating a plurality of feature points of a detection object; a step of extracting a plurality of feature points included in an input image as a two-dimensional image or a three-dimensional image and determining a correspondence relationship between an extracted plurality of feature points and a plurality of feature points of the model information; and a step of estimating, based on the correspondence relationship, one or a plurality of second positions of the input image corresponding to one or a plurality of first positions set relatively to the detection object. The one or plurality of first positions is included in a point, a line, or a region.

According to still other aspect of the present invention, there is provided an image processing program that is executed by a computer. The image processing program makes the computer execute: a step of obtaining model information including information indicating a plurality of feature points of a detection object; a step of extracting a plurality of feature points included in an input image as a two-dimensional image or a three-dimensional image and determining a correspondence relationship between an extracted plurality of feature points and a plurality of feature points of the model information; and a step of estimating, based on the correspondence relationship, one or a plurality of second positions of the input image corresponding to one or a plurality of first positions set relatively to the detection object. The one or plurality of first positions is included in a point, a line, or a region.

According to the present invention, it is possible to properly determine a position at which the work is to be given to a detection object, even when the detection object can generate a shape different from a shape registered as model information.

DETAILED DESCRIPTION

Figure 1:
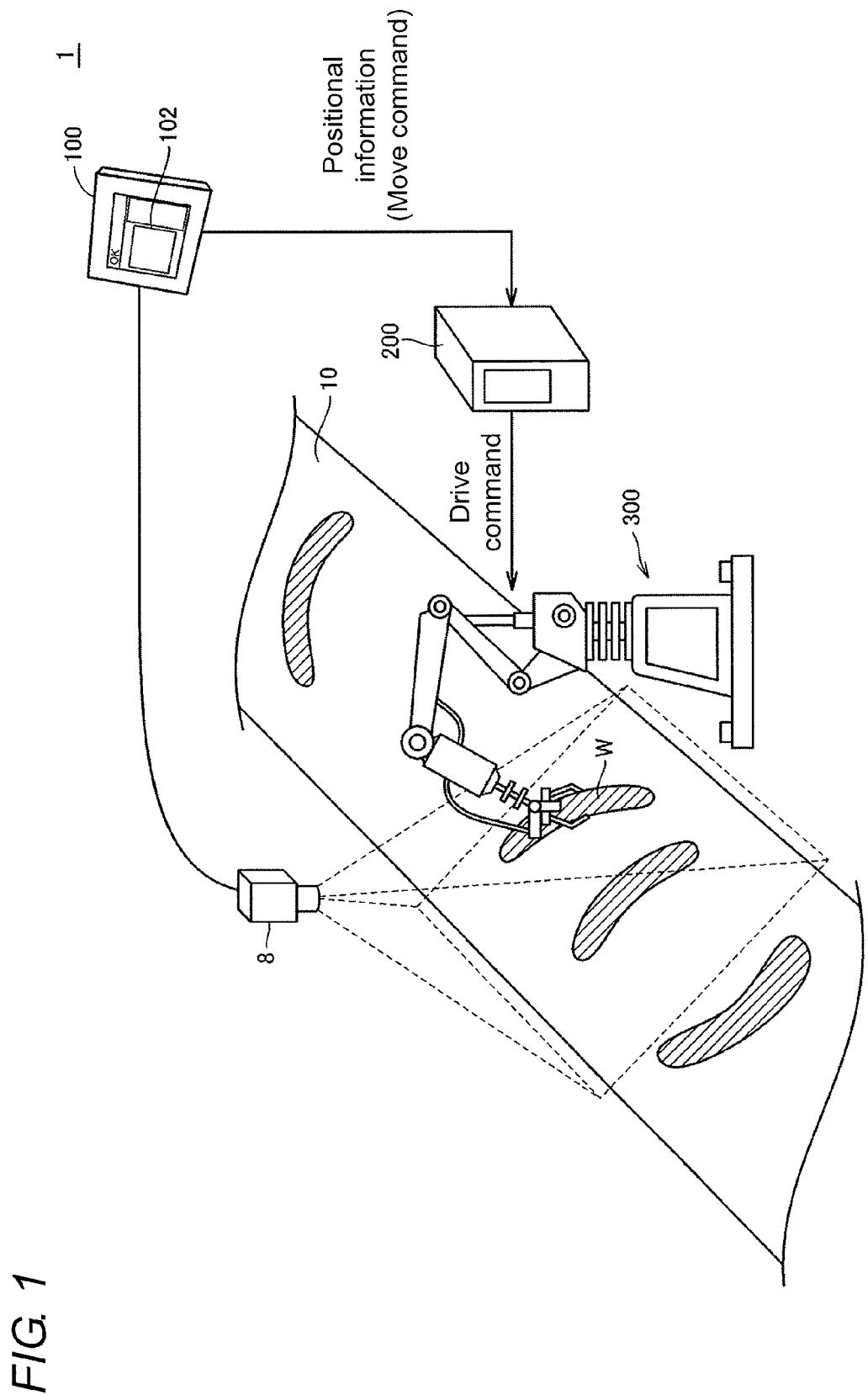
FIG. 1 is a schematic view of a configuration of a system including an image processing device according to the embodiment.

An embodiment of the present invention will be described in detail with reference to the drawings. In the drawings, identical or equivalent portions will be attached with the same signs, and description of these portions will not be repeated.

<A. Configuration of System>

The image processing device according to the embodiment can be applied to various kinds of applications. As an example, there will be described the following application. From information obtained by image-capturing a work, a position, a line, or a region in which the work exists is specified. At a position, or in a line or a region arbitrarily determined based on the specified position, line or region, a robot gives a certain work to the work. A "line segment" or a "region" in which the work exists, and a "line segment" or a "region" in which the work is given can be regarded as a set of a plurality of positions. Hereinafter, for convenience of description, there will be described a processing of specifying or detecting mainly a "position" (that is, one coordinate value). However, the processing is not limited to this. It is also possible to specify or detect a "line segment" or a "region" as a set of a plurality of coordinate values. That is, one or a plurality of positions that are focused are included in a point, a line, or a region. A search processing is performed by using the point, line, or region as a unit.

In the present specification, the "input image" can include a two-dimensional image and a three-dimensional image. For convenience of description, a two-dimensional image will be mainly described as an example. However, it is self-evident that a similar processing can be also applied to a three-dimensional image. That is, a similar processing can be used, by properly setting according to a kind of the input image, a method of estimating a correspondence relationship described later. That is, in a two-dimensional image, representatively, points are arranged on a flat surface. In a three-dimensional image, representatively, points are arranged on a curved surface. When displaying a three-dimensional image, a rendering processing may be performed two dimensionally. Particularly, in the case of applying the processing to a robot described later, it is preferable to use a three-dimensional image for the input image.

FIG. 1 is a schematic view of a configuration of a system 1 including an image processing device 100 according to the embodiment. In FIG. 1, the system 1 mainly includes the image processing device 100, a robot controller 200, and a robot 300. The system 1 image-captures a part of a region on a conveyor 10 by using an image capturing unit 8, and processes the image (hereinafter, also referred to as "input image") obtained by the image capturing. Based on this processing, the system 1 specifies a position of a detection object (hereinafter, also referred to as "work W") conveyed on the conveyor 10, and, based on information of the specified position, grasps the work W at a predetermined position, and moves the work W to outside of the conveyor 10.

More specifically, the image processing device 100 executes the image processing described in detail below to the input image from the image capturing unit 8. The image processing device 100 outputs to the robot controller 200, position information (or a move command) obtained from an execution result of the image processing. The robot controller 200 drives the robot 300, by giving a drive command, following the information from the image processing device 100. Representatively, the robot 300 has a servomotor in each movable shaft, and the robot controller 200 outputs a pulse signal including pulses of a number equivalent to a moving amount calculated for each shaft.

As described later, it is assumed that a position at which the robot 300 should grasp the work W has been pre-registered. More specifically, according to the image processing device 100, in addition to shape information of the work W to be grasped, a position at which a certain work is to be given to the work W has been pre-registered. The image processing device 100 can specify the position at which the work W should be grasped, even when the work W has been changed in a shape different from a shape registered as the model information.

In addition to the system that grasps the work W as shown in FIG. 1, the invention can be also applied to a system that performs an operation or a processing to works. For example, concerning the works, when a disconnection position, a punching position, a grinding position, a printing position, a coating position, and the like have been pre-registered, the image processing device 100 can also specify a position corresponding to the pre-registered position, and perform a processing to works having shapes different from the registered shapes.

<B. Conventional Technique and Problem Thereof>

In order to enhance the understanding of the image processing device and the image processing method according to the embodiment, a conventional technique and a problem thereof will be summarized.

Figure 2A:
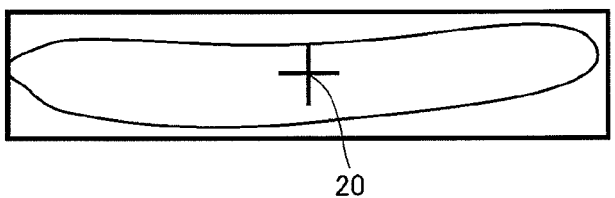
FIG. 2A and FIG. 2B are views for explaining a conventional technique concerning the present invention and a problem of the conventional technique.
Figure 2B:
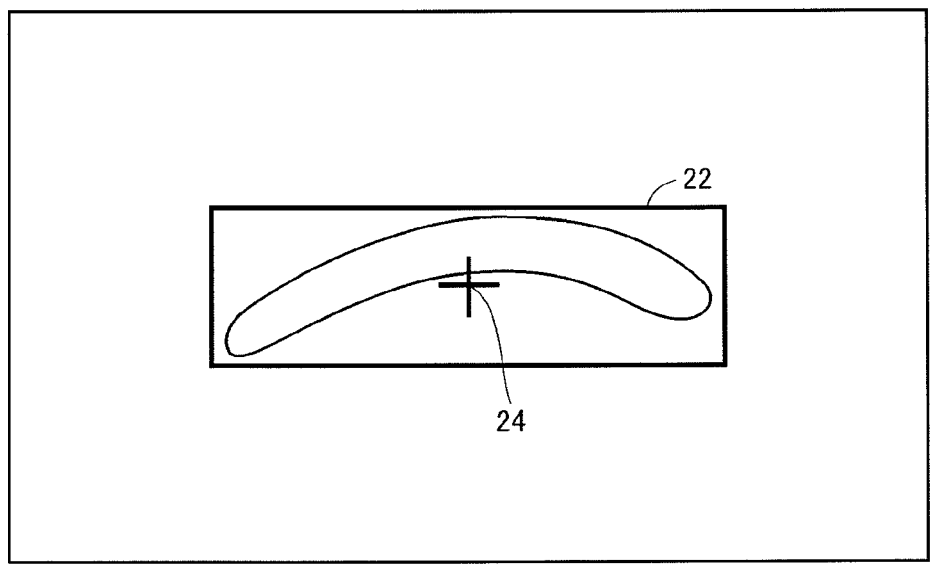

FIG. 2(a) and FIG. 2(b) are views for explaining a conventional technique concerning the present invention and a problem of the conventional technique. As shown in FIG. 2(a), it is assumed that an image of a detection object has been registered as a model image, and that a detection point 20 has been set to the detection object included in the model image. The detection point 20 is, for example, a point on the detection object at which a robot arm (that is, a manipulator) of the robot 300 is to be made to act or move.

In this state, it is assumed that the input image as shown in FIG. 2(b) has been obtained. It is assumed that a shape of the detection object included in the input image shown in FIG. 2(b) is different from a shape of the detection object included in a pre-registered model image, and is in what is called a deformed state.

When a technique of representative pattern matching is used, by sequentially changing a relative position, a relative angle, and a relative size of the model image relative to the input image, a position, an angle, and a size of which matching degrees (or a similarity degree) become highest are searched for. Following the position, the angle, and the size determined as a result of the search, the model image is superposed with the input image (that is, transformation is applied). Then, a detection point 24 after the transformation in the superposed model image (equivalent to a region 22 in (FIG. 2(b)) corresponding to the detection point 20 of the model image is determined.

According to such a method, deformation of the detection object is not taken into account. Because the detection point 24 is determined from the position of the region 22, it is not possible, in some cases, to correctly determine a position corresponding to the detection point intended at the model registration time, as shown in FIG. 2(b). That is, in the example shown in FIG. 2(b), because of the deformation of the detection object from the model image, there occurs a result that even when the manipulator of the robot 300 has been moved, the detection object does not exist.

As other pattern matching method, there is the following method. As a feature amount of the model image, not the model image as it is, there are registered in advance control points such as a meshed point group and edges. By using these pieces of information, matching with the input image is performed. In this method, it is also assumed that there is no substantial change in shapes between the detection object registered as a model and the detection object included in the actually measured input image. Therefore, in some cases, it is not possible to correctly understand to which position of the input image a pre-registered detection point corresponds.

As described above, according to the conventional method, it is not possible to correctly specify to which coordinate value of the input image a detection point arbitrarily set relatively to the model corresponds to. Therefore, there has been a case where it is not possible to understand a grasp position of the detection object and a position at which the robot arm should be moved. That is, according to the conventional method, it has been difficult to stably estimate a detection point of the detection object of which a shape is different from a shape at the model registration time.

The image processing device and the image processing method according to the embodiment have an object of properly determine a position at which the work is to be given to a detection object, even when the detection object can generate a shape different from a shape registered as model information. Accordingly, it is possible to stably perform manipulation and various kinds of processing to the detection object of which a shape is deformed.

<C. Summary>

The image processing device 100 according to the embodiment determines a correspondence relationship between a detection object pre-registered as a model and a detection object included as a photographic subject in an input image, and estimates by interpolation a detection point corresponding to an arbitrarily set detection point, by utilizing the correspondence relationship.

Figure 3A:
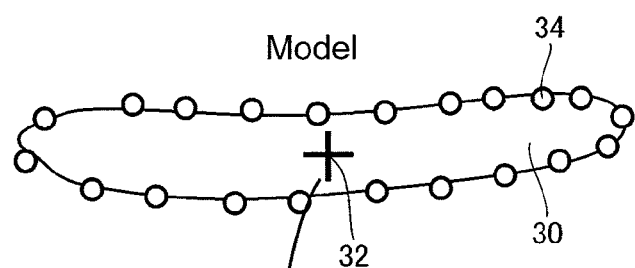
FIGS. 3A and 3B are views of an example of a model image and an input image that the image processing device according to the embodiment processes.
Figure 3B:
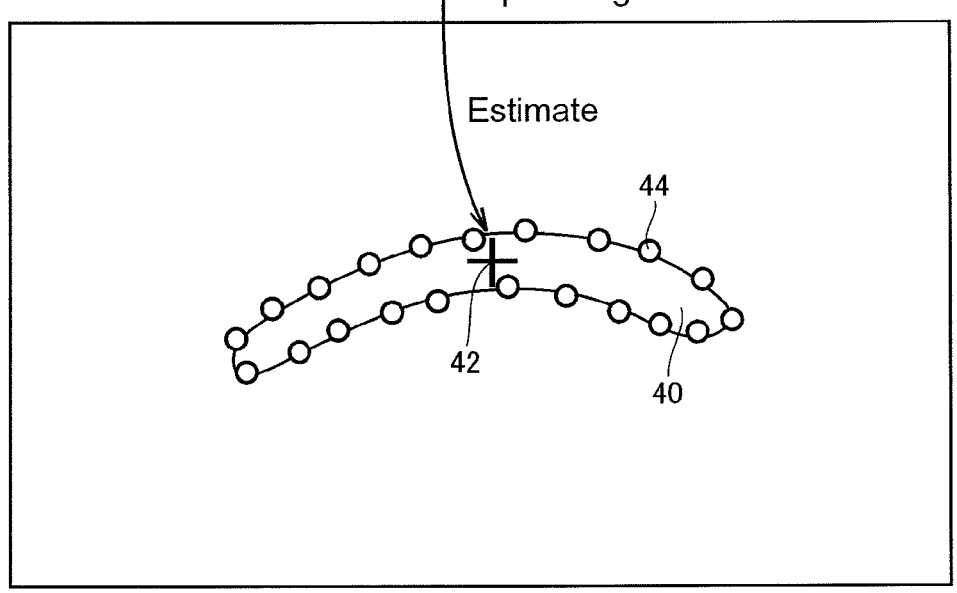
Figure 4:
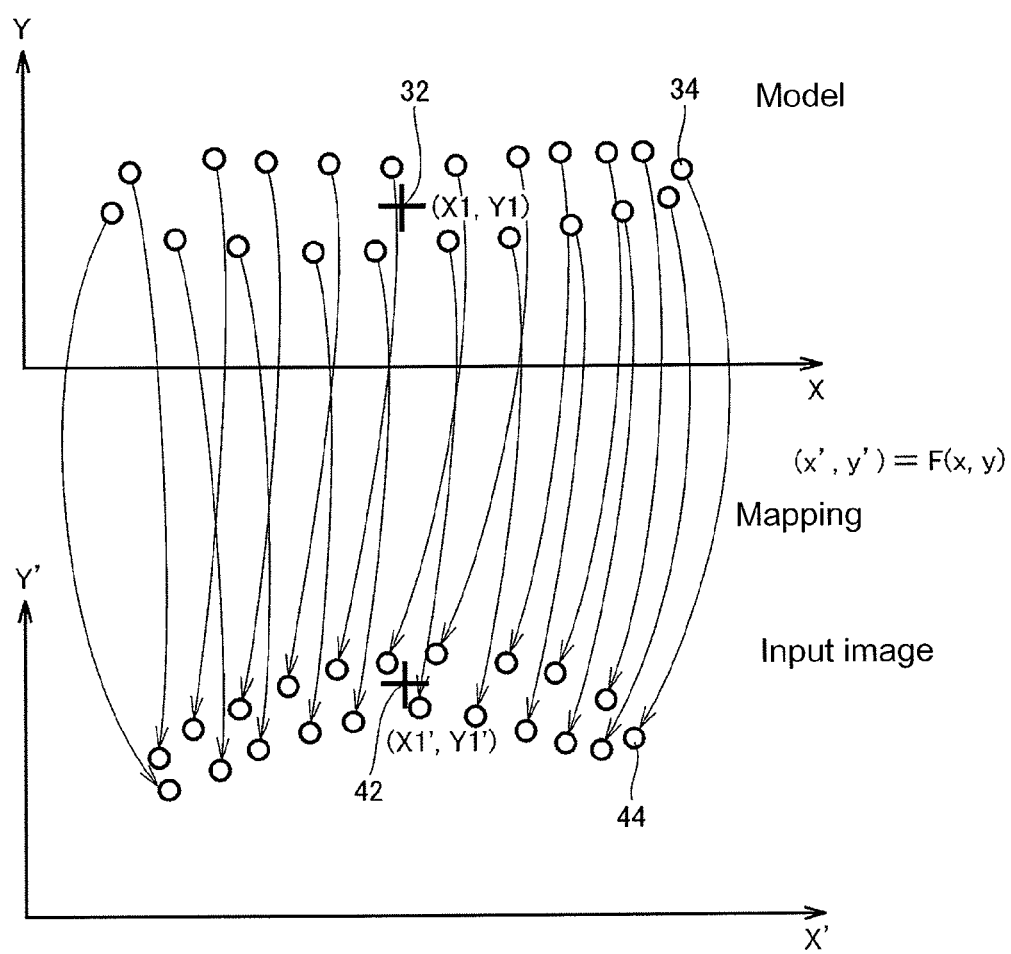
FIG. 4 is a view of an example of a correspondence relationship determined for the model image and the input image shown in FIGS. 3A and 3B.

FIGS. 3(a) and 3(b) are views of an example of the model image and the input image that the image processing device 100 according to the embodiment processes. FIG. 4 is a view of an example of the correspondence relationship determined for the model image and the input image shown in FIGS. 3(a) and 3(b).

First, as shown in FIG. 3(a), at a model registration time, a user assigns one or a plurality of detection points 32 (a "+" mark in the drawing) that the user wants to specify in each input image. That is, the user assigns one or a plurality of detection points of which positions that the user wants to know in an image-captured detection object 30.

At the model registration time, the image processing device 100 extracts a feature amount from the image that expresses the model 30, determines as control points 34 feature points indicating a noticeable feature amount (an edge peak point, in the example shown in FIG. 3(a)), and registers the control points 34. Concerning each of the control points 34, information indicating a position (that is, a coordinate value) and a corresponding feature amount (one or a plurality of feature amounts near the control point can be included) are stored by relating the information and the feature amount to each other. In general, a plurality of the control points 34 is registered.

The control points 34 may be automatically determined following a known algorithm, or may be artificially given. Further, the control points 34 may be determined by a combination of both methods. That is, the control points may be automatically determined following the algorithm, and also the user may artificially adjust the automatically determined control points. As described later, an interpolation function can be determined when a correspondence relationship with the input image has been obtained. Therefore, an arbitrary assigning method or calculation method can be used for control points that are used to determine the correspondence relationship and the interpolation function.

In this way, the image processing device 100 extracts a plurality of feature points from the model image including the detection object 30 as a photographic subject. Then, the image processing device 100 holds model information including the information indicating the control points 34 as a plurality of feature points of the detection object 30. The control points may be assigned by using coordinate values of the feature points themselves, or may be assigned by using a relative position from a certain feature point.

Subsequently, the image capturing unit 8 obtains the input image by image-capturing as shown in FIG. 3(b). The image processing device 100 extracts feature amounts from the input image, and determines control points 44 corresponding to the control points 34 pre-registered as a model. That is, the image processing device 100 extracts a plurality of feature points included in the input image, and also determines a correspondence relationship between the extracted plurality of feature points and a plurality of feature points of the model information.

Finally, the image processing device 100 estimates a position of a detection point 42 of which the position that the user wants to know, based on a whole or a part of the information of the control points 44 extracted from the input image. That is, based on the determined correspondence relationship, the image processing device 100 estimates the detection point 42 (a second position) of the input image, corresponding to the detection point 32 (a first position) that has been relatively set to the detection object 30.

Not only a single detection point 32 as described above, a plurality of detection points are also set. A correspondence relationship is also estimated in the unit of a line or a region as a set of a plurality of detection points.

As shown in FIG. 3(b), the estimated control points 44 may be displayed on the input image by relating the control points 44 to the input image. That is, the image processing device 100 may have the function of displaying positions of the estimated one or plurality of control points 44 in superposition with the input image.

Representatively, as shown in FIG. 4, the image processing device 100 determines a correspondence relationship between a plurality of control points 34 pre-registered as a model and a plurality of control points 44 extracted from the input image. Then, the image processing device 100 calculates an interpolation function that indicates mapping the plurality of control points 44 from the plurality of control points 34. That is, the image processing device 100 relates, as one to one, each feature point of the model information and each feature point extracted from the input image, and determines the interpolation function expressing a correspondence relationship between a set of a plurality of feature points of the model information and a set of a plurality of feature points extracted from the input image.

As an example, the image processing device 100 determines an interpolation function F(x, y) that defines a relationship between an arbitrary coordinate value (x, y) on the model image and an arbitrary coordinate value (x', y') on the input image. As a method of determining such an interpolation function, a thin-plate spline interpolation and the like can be used. At this time, a part or a whole of corresponding points may be used. That is, the image processing device 100 may determine a function that expresses a correspondence relationship by using a whole or a part of the set of the feature points that have been related as one to one. Further, the image processing device 100 may display the feature points to the user so that the user can understand the feature points used to determine the function which expresses the correspondence relationship.

Figure 5:
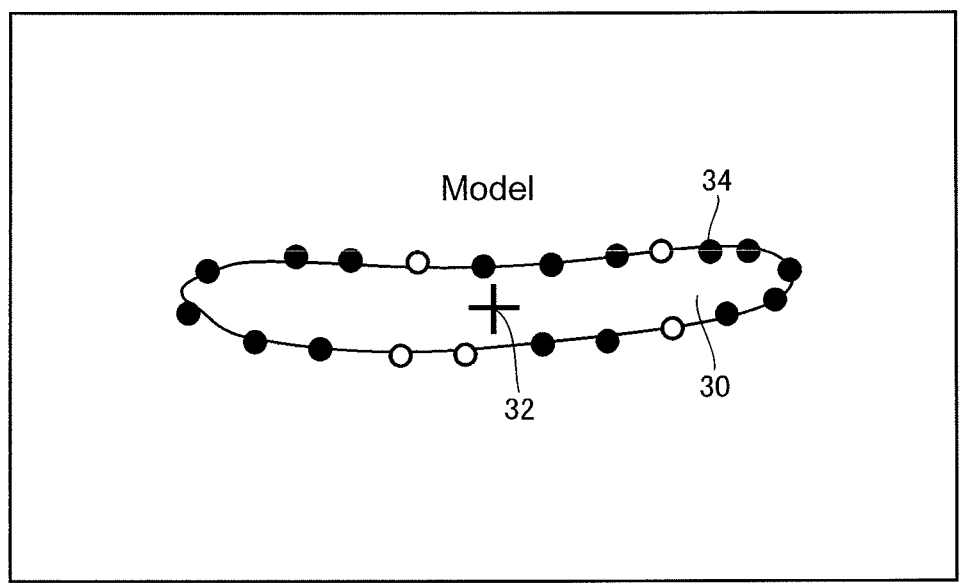
FIG. 5 is a view illustrating a display example indicating feature points used to determine a function expressing a correspondence relationship provided by the image processing device according to the embodiment.
Figure 5:
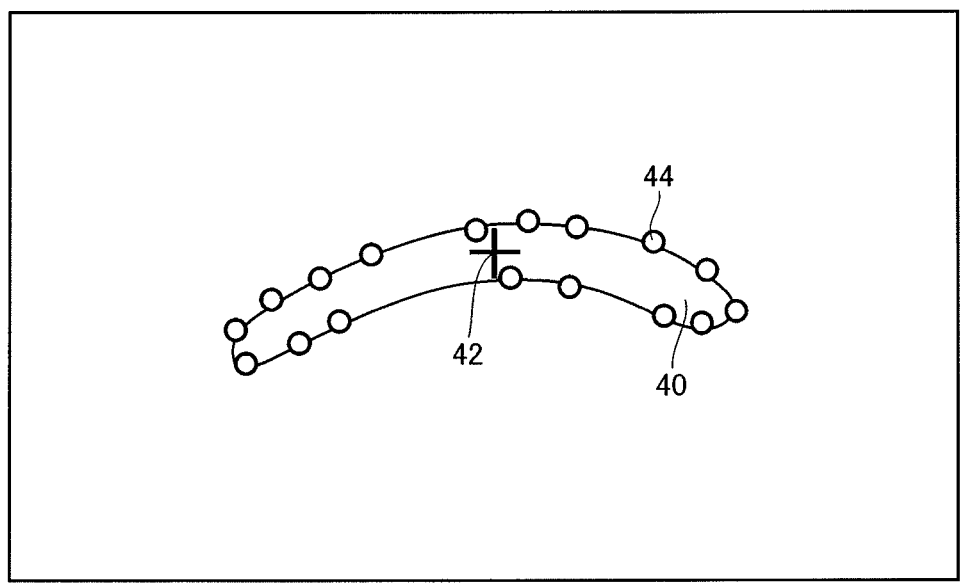

FIG. 5 is a view illustrating a display example indicating feature points used to determine a function expressing a correspondence relationship provided by the image processing device according to the embodiment. As shown in FIG. 5, out of the control points 34 set in the model 30, corresponding control points 44 that have been able to be found from the input image including a detection object 40 are displayed in a mode different from a mode of control points 44 that have not been able to be found from the input image including the detection object 40. By using such a visual expression, concreteness of description to the user can be enhanced.

The detection point 32 may be assigned by using the coordinate values themselves of the detection points 32 on the model image. Alternatively, the detection points 32 may be assigned by using relative positions and/or relative distances from one or a plurality of control points 34 adjacent to the detection point 32 may be assigned. By the former assigning method, the detection point 42 on the input image can be determined from the coordinate values of the detection point 32 and the interpolation function (x, y). By the latter assigning method, the control points 44 on the input image can be determined from the control points 34 used for the assignment and from the interpolation function F(x, y). Further, the detection points 42 can be determined from the control points 44. That is, the image processing device 100 calculates coordinate values (X1', Y1') of the detection point 42 (the second position) from coordinate values (X1, Y1) that express the pre-set detection point 32 (the first position) and from the interpolation function F(x, y) that expresses the correspondence relationship.

In the case where a three-dimensional image is used as the input image, the image processing device 100 calculates coordinate values (X1', Y1', Z1') of the detection point 42 (the second position) from coordinate values (X1, Y1, Z1) that express the pre-set detection point 32 (the first position) and from the interpolation function F(x, y, z) that expresses the correspondence relationship.

In the case where the detection object is a natural derivative, a certain level of fluctuation occurs inescapably. Therefore, in some cases, all the control points 44 that correspond to the control points 34 determined based on the model image cannot be searched for. On the other hand, in the case where the detection object is an artifact, all the control points 44 that correspond to the control points 34 determined based on the model image can be searched for easily.

The interpolation function may be determined by using only the searched corresponding points.

In this way, the image processing device 100 calculates the correspondence relationship between the control points, that is, the interpolation function. By using the interpolation function, the image processing device 100 estimates the detection points 42 on the input image, by mapping the detection points 32 on the model image.

<D. Hardware Configuration of the Image Processing Device 100>

Figure 6:
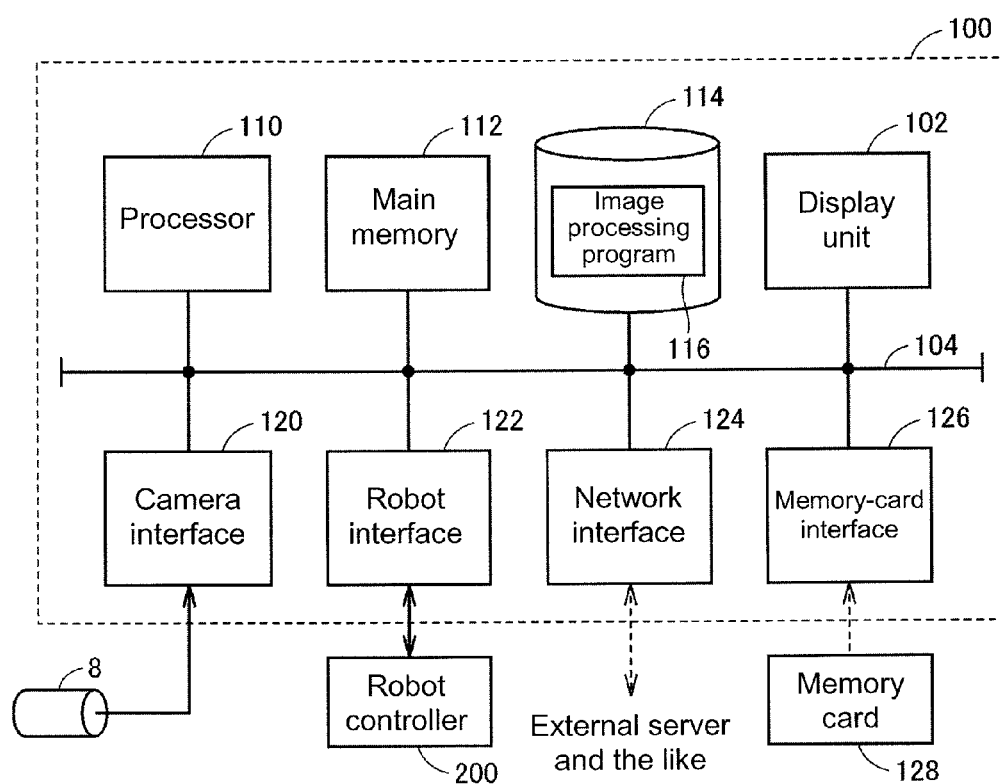
FIG. 6 is a schematic view of a hardware configuration of the image processing device according to the embodiment.

FIG. 6 is a schematic view of a hardware configuration of the image processing device 100 according to the embodiment. In FIG. 6, the image processing device 100 representatively has a structure following a general-purpose computer architecture. The processor realizes various kinds of image processings described later, by executing a program installed in advance.

More specifically, the image processing device 100 includes a display unit 102, a processor 110 such as a CPU (Central Processing Unit) and an MPU (Micro-Processing Unit), a main memory 112, a hard disk 114, a camera interface 120, a robot interface 122, a network interface 124, and a memory card interface 126. These parts are connected to each other so as to be able to perform data communications via an internal bus 104.

The processor 110 executes the image processing of the embodiment, by reading an image processing program 116 stored in the hard disk 114, and executing the image processing program 116 by developing in the main memory 112. The display unit 102 displays various kinds of information accompanied with the execution of the image processing. A part or a whole of the execution result of the image processing may be output to the robot controller 200 through the robot interface 122.

The image processing program 116 is distributed in the state of being stored in a memory card 106, for example. In this case, the image processing program 116 stored in the memory card 106 is read through the memory card interface 126, and is then installed in the hard disk 114. Alternatively, the image processing program 116 may be configured to be distributed from the external server through the network interface 124.

In the case of using the image processing device 100 having a structure following a general-purpose computer architecture, there may be pre-installed an OS (Operating System) for providing a basic function of the computer. In this case, the image processing program 116 may be the one for executing a processing by calling a necessary module in a predetermined order and/or in a predetermined timing, out of program modules provided as a part of the OS. That is, the image processing program 116 may not include all modules necessary for the image processing of the embodiment, and may be in the mode of providing a part of the necessary modules from the OS. Further, the image processing program 116 of the embodiment may be provided by being built in a part of other program.

The camera interface 120 receives the input image obtained by image-capturing by the image capturing unit 8. The image capturing unit 8 is representatively configured by including image capturing elements such as a CCD (Charged Couple Device) and a CMOS (Complementary Metal Oxide Semiconductor) sensor, in addition to an optical system such as a lens. In the case of using a two-dimensional image as the input image, an ordinary image sensor can be used. In the case of using a three-dimensional image as the input image, it is possible to use a stereo camera, and a combination of an ordinary image sensor and a distance sensor and the like.

FIG. 1 shows a configuration example that the image capturing unit 8 is provided separately from the image processing device 100, and an input image that becomes the object of the image processing is provided from the image capturing unit 8. However, the configuration is not limited to this example. For example, the image processing device 100 and the image capturing unit 8 may be integrally configured, and the image processing may be directly executed to the input image generated by the image capturing. Alternatively, the input image that becomes the object of the image processing may be given to the image processing device 100 via various kinds of memory mediums or communication mediums.

Alternatively, a part or a whole of the functions provided by executing the image processing program 116 may be installed as a dedicated hardware circuit.

<E. Functional Configuration of the Image Processing Device 100>

Figure 7:
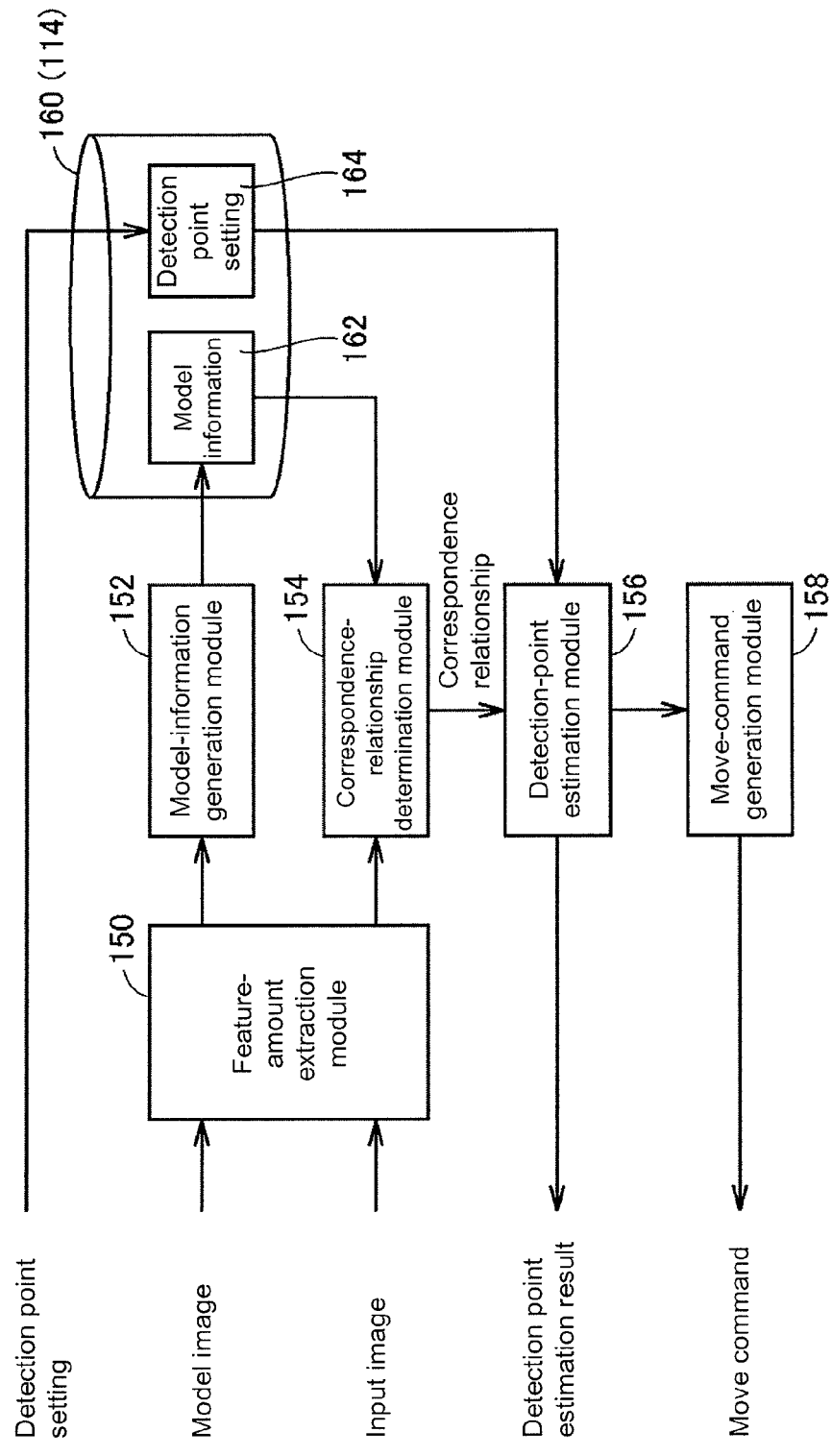
FIG. 7 is a schematic view of a functional configuration of the image processing device according to the embodiment.

FIG. 7 is a schematic view of a functional configuration of the image processing device 100 according to the embodiment. Each module shown in FIG. 7 is representatively realized by the processor 110 executing the image processing program 116 (both shown in FIG. 6).

In FIG. 7, the image processing device 100 includes, as a functional configuration thereof, a feature-amount extraction module 150, a model-information generation module 152, a correspondence-relationship determination module 154, a detection-point estimation module 156, and a move-command generation module 158. However, the move-command generation module 158 is optional, and is provided according to the need. A data storage unit 160 is provided in a region of at least a part of the hard disk 114 (FIG. 6).

The feature-amount extraction module 150 receives the model image or the input image, and extracts a feature amount included in the image. That is, the feature-amount extraction module 150 extracts a plurality of feature points from the model image including the detection object as a photographic subject and the input image. The information of the extracted feature amount of the model image is given to the model-information generation module 152. The information of the extracted feature amount of the input image is given to the correspondence-relationship determination module 154.

The model-information generation module 152 generates model information 162 that includes information of a plurality of feature points (the control points 34) of the detection object included in the model image. Representatively, the model information includes both information (coordinate values) indicating a position of each control point 34, and a feature amount corresponding to the each control point 34. The model information 162 is stored in the data storage unit 160. That is, the data storage unit 160 holds the model information 162 including the information indicating the plurality of feature points (the control points 34) of the detection object.

The model-information generation module 152 basically automatically extracts the control points 34 from the model image. However, the user may manually change the automatically extracted control points 34, or the user may set the control points 34 at arbitrary positions. For example, by setting the control points 34 to points (inflection points, corners, crests, and the like) at which the outline of the detection object changes, the user can easily search for corresponding control points.

The data storage unit 160 also stores a detection point setting 164 that indicates coordinate values of the detection points that the user has arbitrarily set.

Based on the model information 162 stored in the data storage unit 160, the correspondence-relationship determination module 154 determines the control points 44 of the input image from the feature amount extracted from the input image, and further determines the correspondence relationship between the control points 44 of the input image and the plurality of control points 34 of the model information 162. That is, the feature-amount extraction module 150 and the correspondence-relationship determination module 154 extract the plurality of feature points (the control points 44) included in the input image, and also determine the correspondence relationship between the extracted plurality of feature points and the plurality of feature points of the model information 162.

Based on the correspondence relationship determined by the correspondence-relationship determination module 154, the detection-point estimation module 156 estimates the coordinate values of the corresponding detection point 32 of the input image from the coordinate values of the detection point 20 included in the detection point setting 164 stored in the data storage unit 160. That is, based on the correspondence relationship, the detection-point estimation module 156 estimates the detection point 42 (the second position) of the input image corresponding to the detection point 32 (the first position) relatively set to the detection object. The coordinate values of the estimated detection point 32 are given to the robot 300, as position information.

The move-command generation module 158 generates a move command to be output to the robot 300 as the external device from the coordinate values of the detection point 32 estimated by the detection-point estimation module 156. Representatively, the detection-point estimation module 156 estimates a plurality of detection points 42 (the second position) respectively corresponding to a plurality of detection points 32 (the first position) relatively set to the detection object. The move-command generation module 158 generates a command from the plurality of detection points 42. For example, the move-command generation module 158 can set a start point and an end point of processing on the model image, estimate points on the input image each corresponding to the start point and the end point, and can determine a locus that connects between the estimated start point and end point.

<F. Processing Procedure of the Image Processing Device 100>

Figure 8:
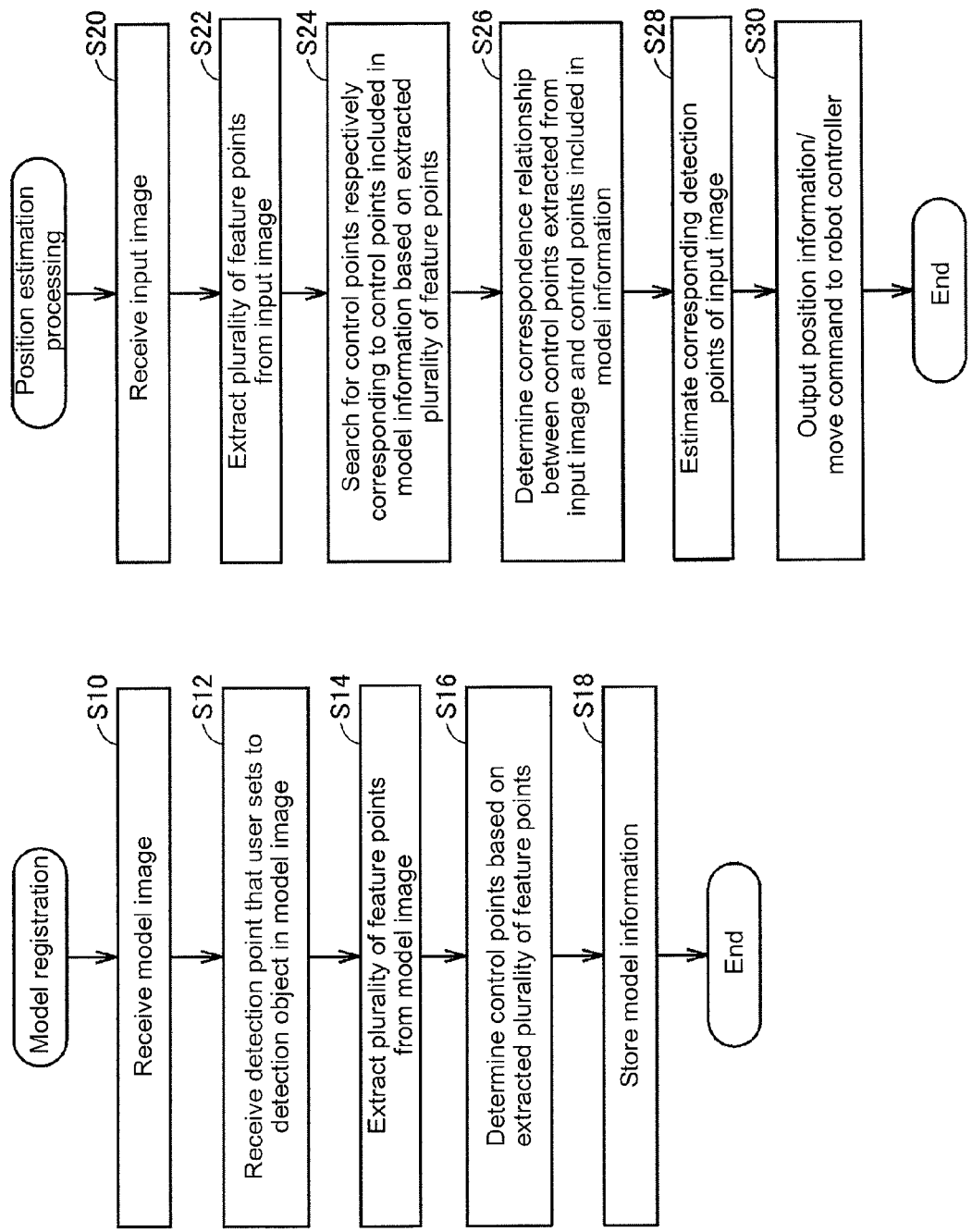
FIG. 8 is a flowchart expressing a processing procedure to be executed by the image processing device according to the embodiment.

FIG. 8 is a flowchart expressing a processing procedure to be executed by the image processing device 100 according to the embodiment. Representatively, the processor 110 realizes the steps shown in FIG. 8 by executing the image processing program 116 (shown in FIG. 6).

The processing procedure shown in FIG. 8 includes a model registration processing for registering model information from the model image, and an estimation processing for estimating corresponding detection points of the input image. Basically, the estimation processing is executed after the model registration processing has been executed. However, the order of these processings is not limited. Model information is registered in advance by a one-time model registration processing. By using in common the registered model information, the estimation processing may be performed to a plurality of input images.

In FIG. 8, in the model registration processing, the processor 110 receives the model image (Step S10). More specifically, when a command has been given to the image capturing unit 8, in the state that the user has arranged the detection object as a model in the view field of the image capturing unit 8, a model image obtained by image-capturing by the image capturing unit 8 is obtained.

Next, the processor 110 receives the detection point 20 that the user has set to the detection object in the model image (Step S12). More specifically, the model image is displayed in the display unit 102 or the like. The user operates with the mouse or the like a position of the indicator (a "+" mark shown in FIG. 4, for example) overview-displayed on the model image. As a result, the detection point 20 is set.

Next, the processor 110 extracts a plurality of feature points from the model image (Step S14), and determines the control points 34 based on the extracted plurality of feature points (Step S16). Finally, the processor 110 stores the model information including the information indicating the plurality of feature points (the control points 34) of the detection object extracted from the model image (Step S18). With the above steps, the model registration processing ends.

On the other hand, in the estimation processing, the processor 110 receives the input image (Step S20). More specifically, when the detection object has reached the view field of the image capturing unit 8, a command is given to the image capturing unit 8. The image capturing unit 8 image-captures the detection object and obtains the input image.

Next, the processor 110 extracts a plurality of feature points from the input image (Step S22). Based on the extracted plurality of feature points, the processor 110 searches for the control points 44 respectively corresponding to the control points 34 included in the model information (Step S24). The processor 110 determines the correspondence relationship between the control points 34 extracted from the input image and the control points 34 included in the model information (Step S26). Then, based on the correspondence relationship determined in Step S26, the processor 110 estimates the corresponding detection points 42 of the input image corresponding to the detection points 32 relatively set in the model registration processing, to the detection object (Step S28). Further, by using the coordinate values of one or a plurality of the detection points 42 estimated in Step S28, the processor 110 outputs position information (or a move command) to the robot controller 200 and controls the robot 300 (Step S30). With the above steps, the estimation processing ends.

<G. Modification of Estimation Processing of Detection Point>

Concerning the above estimation processing of the detection points, the following modification can be also installed.

For example, in the case of calculating the above correspondence relationship, that is, the interpolation function which indicates mapping from the plurality of control points 34 of the model image to the plurality of control points 44 of the input image, all the plurality of control points 34 may be used, or only several control points 44 near the pre-set detection points may be used.

Figure 9:
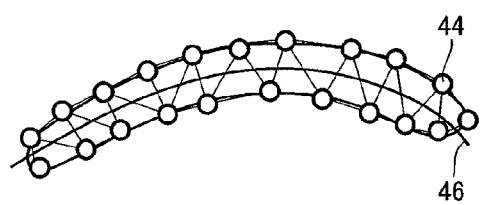
FIG. 9 is an explanatory view of a modification of an estimation processing of detection points by the image processing device according to the embodiment.

FIG. 9 is an explanatory view of a modification of the estimation processing of detection points by the image processing device 100 according to the embodiment. In FIG. 9, for example, in the case of disconnecting or coating the detection object along a line that divides the detection object in the longitudinal direction, out of the extracted control points 44, adjacent control points 44 are connected to each other to generate truss-like triangles. By connecting between the points that divide into two the internal sides of each triangle, a plurality of corresponding detection points (a detection region) 46 are estimated. In the processing of generating truss-like triangles, Delaunay triangle and the like can be utilized.

In estimating corresponding detection points of the input image, when only the neighborhood control points 44 have been used, it is preferable to enhance concreteness of description to the user by visually expressing the neighborhood control points 44.

Figure 10:
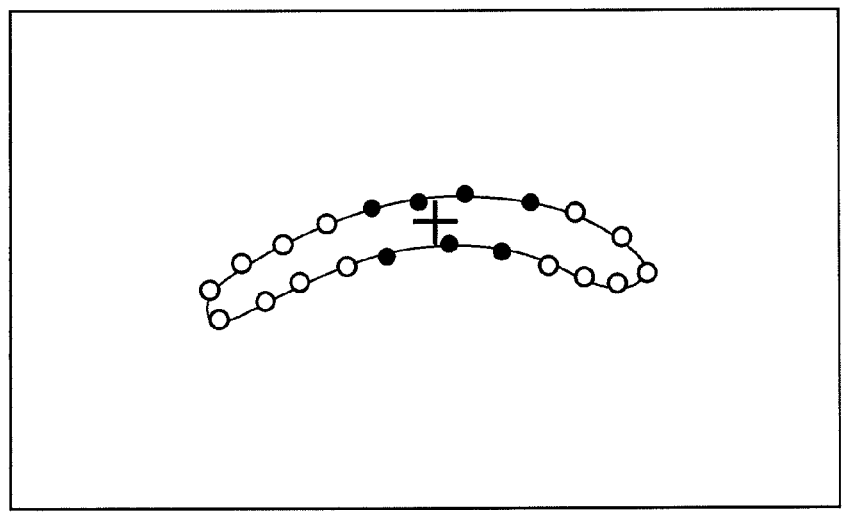
FIG. 10 is a view of a screen example expressing an estimation processing result of detection points by the image processing device according to the embodiment.

FIG. 10 is a view of a screen example expressing an estimation processing result of detection points by the image processing device 100 according to the embodiment. In FIG. 10, in estimating the detection points 42 of the input image, when only the neighborhood control points 44 have been used, the control points 44 used to estimate the detection points 42 may be displayed in a mode different from that of other control points 44. That is, when neighborhood several control points 44 have been used to estimate the detection points 42, it is preferable to clearly divide in color the neighborhood control points 44 to enable the user to grasp at a glance the control points 44 used for the interpolation.

<H. Interface with the Robot Controller 200 and the Robot 300>

As described above, by using the estimation result of the detection points 42 by the image processing device 100 according to the embodiment, it is possible to grasp the work and perform various kinds of processing (disconnection, punching, grinding, printing, coating, and the like) to the work, for example. In the case of grasping, coordinate values of one detection point of the input image may be output. In the case of performing various kinds of processing, it is necessary to sequentially calculate coordinate values of a plurality of detection points, and output a command indicating a locus of the robot 300 by using the calculation results.

For example, in the case of the processing of coating and disconnection, it is necessary to estimate a plurality of detection points such as a start point and an end point of disconnection. In such a case, the detection points can be determined by a method similar to that described above. In this case, by more densely arranging the control points, a curve to be operated may be realized. Further, by interpolating a plurality of discrete detection points, a continuous locus of the robot 300 may be determined.

When the locus of performing various kinds of processing to the work is relatively long, an attempt to estimate detection points corresponding to all locus results in a relatively large processing amount. Accordingly, for each of the plurality of detection points of which positions on the input image the user wants to know, neighborhood several control points on the model image and relative positions from the control points are registered in advance. When the shape of the input image has been deformed as compared with the model image, the pre-registered relative positions are applied to each detection point, based on corresponding several control points. Consequently, the detection points of the input image are sequentially calculated. By employing the above method, operation amount concerning the calculation can be reduced.

The image processing device 100 may directly output the estimated interpolation function to the robot controller 200. In this case, the robot controller 200 corrects the pre-set orbit by using the given interpolation function, and then sequentially calculates the locus that gives work to the detection object.

Alternatively, the coordinate values of the control points 44 of the input image searched for by the image processing device 100 may be output to the robot controller 200. In this case, the robot controller 200 calculates the locus from the given coordinate values of the control points 44, and drives the robot 300.

The content and the type of the position information (or the move command) output from the image processing device 100 to the robot controller 200 may be appropriately differentiated according to the specification of the robot and the processing content. Further, when the system 1 can selectively execute various kinds of processing to the detection object, there may be provided for the user a user interface screen that receives a selection of which one of a plurality of processings prepared in advance should be executed.

<I. Conclusion>

Even when a detection object having a shape different from a shape of the detection object registered as model information exists in the input image, the image processing device 100 according to the embodiment can correctly estimate a corresponding position of an arbitrary detection point arbitrarily set relative to the detection object. Accordingly, to a detection object of which a shape changes due to a certain factor, by giving a proper command to the robot 300 and the like, a target work can be given at a target position.

A case where the detection object having flexibility is deformed has been mainly described above. However, the present invention can be also applied to deformation based on projection transformation generated by movement of the image capturing unit, for example. That is, in addition to free deformation of the detection object, the present invention can be also applied to constrained deformation that occurs when a change has occurred in a relative positional relationship between the image capturing unit and the detection object, though there is no deformation in the shape of the detection object. For example, the invention can be applied to the case where a view point of the image capturing unit has changed and the case where the detection object has turned.

It should be considered that the embodiment disclosed this time is an exemplification in all aspects and is not limiting. The scope of the present invention is expressed in claims and not in the above description, and is intended to include all variations in the meaning and the scope equivalent to the claims.

The invention claimed is:

1. An image processing device comprising:
a processor: and
a memory including instructions that, when executed by the processor, cause the processor to perform operations including:
storing model information comprising information indicating a plurality of feature points of a detection object;
extracting a plurality of feature points comprised in an input image and configured to determine a correspondence relationship between an extracted plurality of feature points and a plurality of feature points of the model information;
estimating, based on the correspondence relationship, one or a plurality of second positions of the input image corresponding to one or a plurality of first positions set relatively to the detection object, the one or plurality of first positions being comprised in a point, a line, or a region: and relating, as one to one, each feature point of the model information and each feature point extracted from the input image, and is also configured to determine, from mutually-related features, an interpolation function indicating a correspondence relationship between a set of a plurality of feature points of the model information and a set of a plurality of feature points extracted from the input image.

2. The image processing device according to claim 1, the operations further including extracting a plurality of feature points from a model image comprising the detection object as a photographic subject.

3. The image processing device according to claim 1, the operations further including determining a function that expresses a correspondence relationship by using a whole or a part of a set of feature points related as one to one.

4. The image processing device according to claim 3, the operations further including calculating coordinate values of the second position from coordinate values expressing a pre-set first position and a function expressing the correspondence relationship.

5. The image processing device according to claim 1, further comprising a display configured to display the estimated one or plurality of second positions in superposition with the input image.

6. The image processing device according to claim 1,
the operations further including estimating each of a plurality of second positions corresponding to a plurality of the first positions relatively set to the detection object, and
generating a command from the plurality of second positions to an external device.

7. A system comprising:
an image processor; and
a robot configured to operate following an output from the processor, wherein the image processor comprises:
a processor; and
a memory including instructions that, when executed by the processor, cause the processor to perform operations including:
storing model information comprising information indicating a plurality of feature points of a detection object;
extracting a plurality of feature points comprised in an input image and configured to determine a correspondence relationship between an extracted plurality of feature points and a plurality of feature points of the model information;

estimating, based on the correspondence relationship, one or a plurality of second positions of the input image corresponding to one or a plurality of first positions set relatively to the detection object;

generating a command to the robot based on the estimated second position, the one or plurality of first positions being comprised in a point, a line, or a region: and relating, as one to one, each feature point of the model information and each feature point extracted from the input image, and is also configured to determine, from mutually-related features, an interpolation function indicating a correspondence relationship between a set of a plurality of feature points of the model information and a set of a plurality of feature points extracted from the input image.

8. The system according to claim 7, the operations further including estimating each of a plurality of second positions corresponding to a plurality of the first positions relatively set to the detection object, and generating the command from the plurality of second positions.

9. An image processing method comprising:

obtaining model information comprising information indicating a plurality of feature points of a detection object;

extracting a plurality of feature points comprised in an input image and determining a correspondence relationship between an extracted plurality of feature points and a plurality of feature points of the model information;

estimating, based on the correspondence relationship, one or a plurality of second positions of the input image corresponding to one or a plurality of first positions set relatively to the detection object, the one or plurality of first positions being comprised in a point, a line, or a region;

relating, as one to one, each feature point of the model information and each feature point extracted from the input image, and is also configured to determine, from mutually-related features, an interpolation function indicating a correspondence relationship between a set of a plurality of feature points of the model information and a set of a plurality of feature points extracted from the input image.

10. A non-transitory computer readable storage medium that stores a computer program for image processing, the computer program, when executed by a processor, causing the processor to perform operations comprising:

obtaining model information comprising information indicating a plurality of feature points of a detection object;

extracting a plurality of feature points comprised in an input image and determining a correspondence relationship between an extracted plurality of feature points and a plurality of feature points of the model information;

estimating, based on the correspondence relationship, one or a plurality of second positions of the input image corresponding to one or a plurality of first positions set relatively to the detection object, the one or plurality of first positions being comprised in a point, a line, or a region; and relating, as one to one, each feature point of the model information and each feature point extracted from the input image, and is also configured to determine, from mutually-related features, an interpolation function indicating a correspondence relationship between a set of a plurality of feature points of the model information and a set of a plurality of feature points extracted from the input image.

* * * * *